(12) United States Patent
Willson et al.

(10) Patent No.: US 11,488,338 B2
(45) Date of Patent: Nov. 1, 2022

(54) EFFICIENT THREE-DIMENSIONAL, INTERACTIVE IMAGE RENDERING

(71) Applicant: Raytheon Company, Waltham, MA (US)

(72) Inventors: Kyle R. Willson, Tucson, AZ (US); Kerry P. Dinsmore, Tucson, AZ (US); Joshua M. Regnier, Tucson, AZ (US); Stephen B. Edwards, McKinney, TX (US)

(73) Assignee: Raytheon Company, Waltham, MA (US)

( * ) Notice: Subject to any disclaimer, the term of this patent is extended or adjusted under 35 U.S.C. 154(b) by 232 days.

(21) Appl. No.: 16/851,538

(22) Filed: Apr. 17, 2020

(65) Prior Publication Data
US 2021/0327115 A1    Oct. 21, 2021

(51) Int. Cl.
*G06T 13/20* (2011.01)
*G06T 19/20* (2011.01)
*G06F 3/04845* (2022.01)
*G06F 3/04815* (2022.01)
*G06F 3/0482* (2013.01)

(52) U.S. Cl.
CPC ............ *G06T 13/20* (2013.01); *G06F 3/0482* (2013.01); *G06F 3/04815* (2013.01); *G06F 3/04845* (2013.01); *G06T 19/20* (2013.01); *G06T 2210/12* (2013.01); *G06T 2219/2004* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| 5,528,735 | A  | 6/1996  | Strasnick et al. |
| 7,880,738 | B2 | 2/2011  | Abagyan et al. |
| 9,170,574 | B2 | 10/2015 | Fuller et al. |
| 9,911,257 | B2 | 3/2018  | Carmi et al. |
| 2005/0131659 | A1 | 6/2005 | Mei et al. |
| 2005/0140694 | A1* | 6/2005 | Subramanian .......... G06F 9/545 345/619 |

(Continued)

FOREIGN PATENT DOCUMENTS

CN    204288217 U    4/2015

*Primary Examiner* — Jennifer Mehmood
*Assistant Examiner* — Jed-Justin Imperial
(74) *Attorney, Agent, or Firm* — Schwegman Lundberg & Woessner, P.A.

(57) ABSTRACT

Discussed herein are devices, systems, and methods for software-based animation. A method can include receiving data indicating a first object name, a corresponding file path of a model, a camera location, a reference point, and an animation of the first object, the animation comprising a stack of atomic animation functions that affect the view of one or more of the first object or the camera, storing the object name, the file path, the camera location, the reference location, and atomic animation functions in a memory, in response to receiving data indicating the first object was selected, automatically retrieving the model based on the file path, providing, by the display, a view of the model of the first object consistent with the camera location and the reference point, and executing the stored atomic animation functions to animate the model of the first object.

20 Claims, 15 Drawing Sheets

(56) References Cited

U.S. PATENT DOCUMENTS

2008/0034292 A1\* 2/2008 Brunner ................. G06T 13/00
                                                                                   715/764
2019/0156545 A1\* 5/2019 Horn .................... G06F 3/04845

\* cited by examiner

US 11,488,338 B2

EFFICIENT THREE-DIMENSIONAL, INTERACTIVE IMAGE RENDERING

TECHNICAL FIELD

Embodiments discussed herein regard devices, systems, and methods for three-dimensional (3D) image rendering that is interactive and efficient (in terms or development time and run time bandwidth consumed).

BACKGROUND 3D image development is typically very labor intensive. A graphic artist can develop different perspective views of the object. Each perspective developed typically requires the graphic artist to laboriously and tediously generate a new rendering of a 3D object in the image. This is especially tedious and time consuming for moving views of the object in the 3D image.

DETAILED DESCRIPTION

Embodiments provide methods, systems, devices, and computer-readable media for efficient 3D image rendering, such as from different perspectives.

Typically, animation is a mostly manual process. If a user in a game world performs action X a rule is defined that the action Y is performed. The action Y includes a series of still frames that are pre-generated and loaded at a specified frame rate to provide the appearance of motion. This process is very tedious as it requires each still image to be generated. If a different perspective (e.g., viewing angle) is desired, another different set of frames is manually produced to account for the differences.

Many game applications include placement and interaction with objects. Some game applications can have no specific goals to accomplish. Such games are called sandbox games. An example of such a game application is Minecraft. In many sandbox games, players place objects in game space, perform operations on the objects, and sometimes cause the objects to interact. These sandbox games typically include rudimentary graphics with limited viewing angles to simplify the animation processes.

Embodiments herein provide a more flexible, simpler approach to game object animation. Embodiments provide this using one or more of a simplified data flow structure and pre-specified motion functions. Embodiments can make the animation much faster and simpler.

Figure 1:
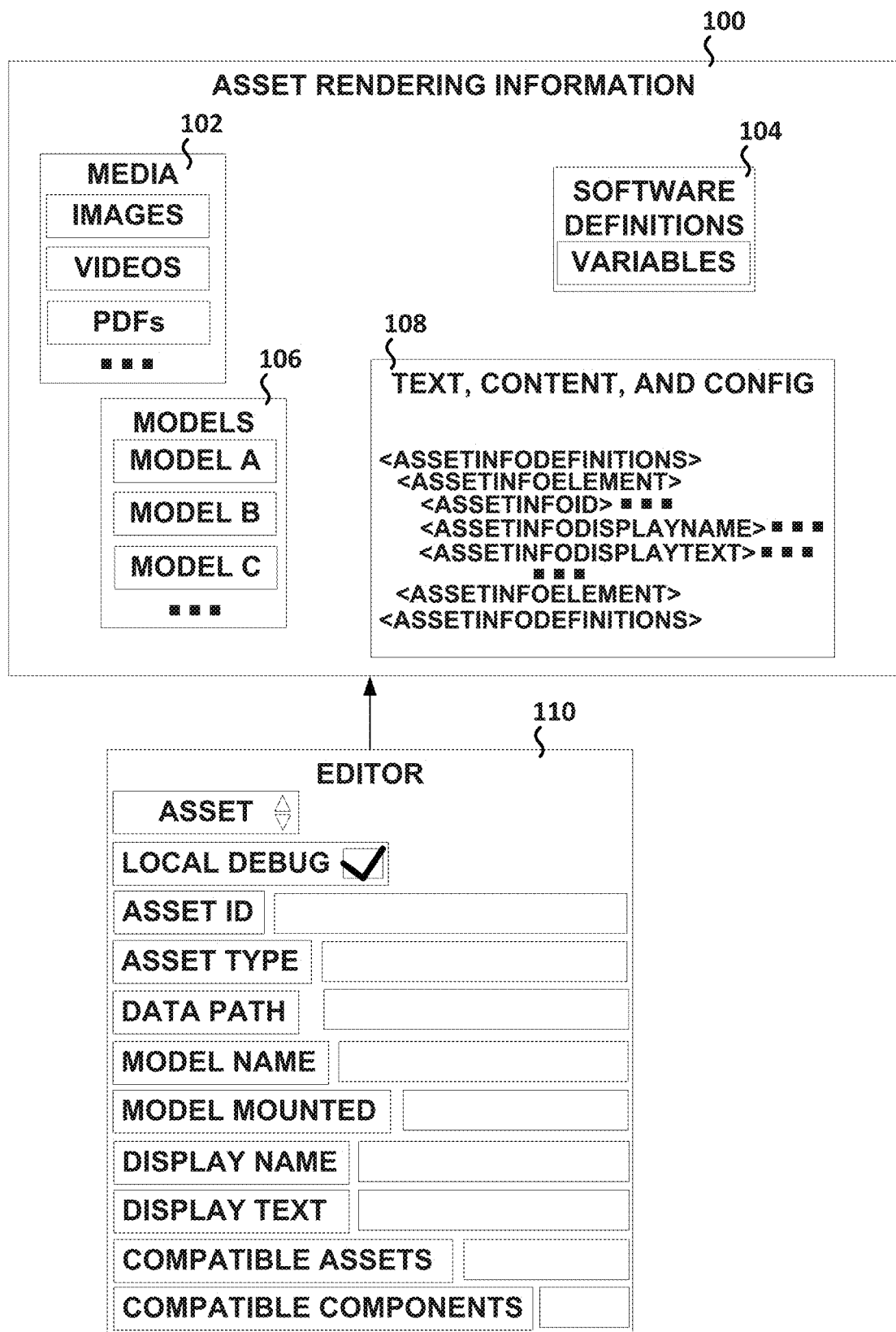
FIG. 1 illustrates, by way of example, a logical diagram of an embodiment of a data structure for simplifying an animation process.

FIG. 1 illustrates, by way of example, a logical diagram of an embodiment of a data structure for simplifying an animation process. The data structure as illustrated includes asset rendering information 100. The asset rendering information 100 can include the data used by a computer processor and a display in providing a view of an animation. The asset rendering information 100 includes media 102, software definitions 104, models 106, an editor 110, and text content and configuration (TCC) 108.

The media 102 includes images, videos, portable data format files (PDFs), or the like. The media 102 can be presented on a UI (e.g., the display device 1510 see FIG. 15). The media 102 can be presented in response to a user selecting (e.g., by a mouse click, touch on a touch screen, issuing an audio command, dwelling with a gaze on the UI, or the like) a software object corresponding to the media 102.

The software definitions 104 includes objects definitions and object-relation definitions. The object definitions can define software objects that a user can interact with through the UI. The object definitions can include a definition of a platform on which they can be placed (e.g., land, sea, air, cyber, a combination thereof, or the like). Example objects include people, vehicles, weapons, buildings, or the like. Another example object is a camera position object that defines a location of a camera. Yet another object is a reference point that defines the view angle and point of focus of the camera object. The object definitions can include relations between other objects. Relations between objects can include a parent, child, grandchild, or the like. To place a child object, a corresponding parent would need to be placed first. To place a grandchild object, a corresponding child object would need to be placed first. Further, a platform of the type required by the object would need to be placed for the object to be placed.

The models 106 include 3D point cloud representations of platform and object models. The models 106 can include intensity data for the 3D point clouds. The intensity data can include red, green, blue, yellow, black, white, or other visible intensity data, infrared intensity data, ultraviolet intensity data, or other no-visible intensity data, or the like.

The text content and configuration (TCC) 108 defines where and how text associated with an object appears on the UI. The text content and configuration 108 can be altered during run time. If a user alters the text content and configuration 108 and the selects the corresponding object, the text content and configuration alterations can be reloaded, as the object can be reloaded. The TCC 108 can be specified in extended markup language (XML) or another format. XML is helpful, because it is human-readable and a software library can load XML directly into application memory.

The editor 110 is a software control UI that allows editing of the asset rendering information 100, such as during runtime. The asset rendering information 100 can be re-loaded into a game application, such as in response to the user making an alteration using the editor 110, the user selecting a corresponding object through the UI, or the user selecting a dedicated software control that causes the asset rendering information 100 to be reloaded.

Figure 2:
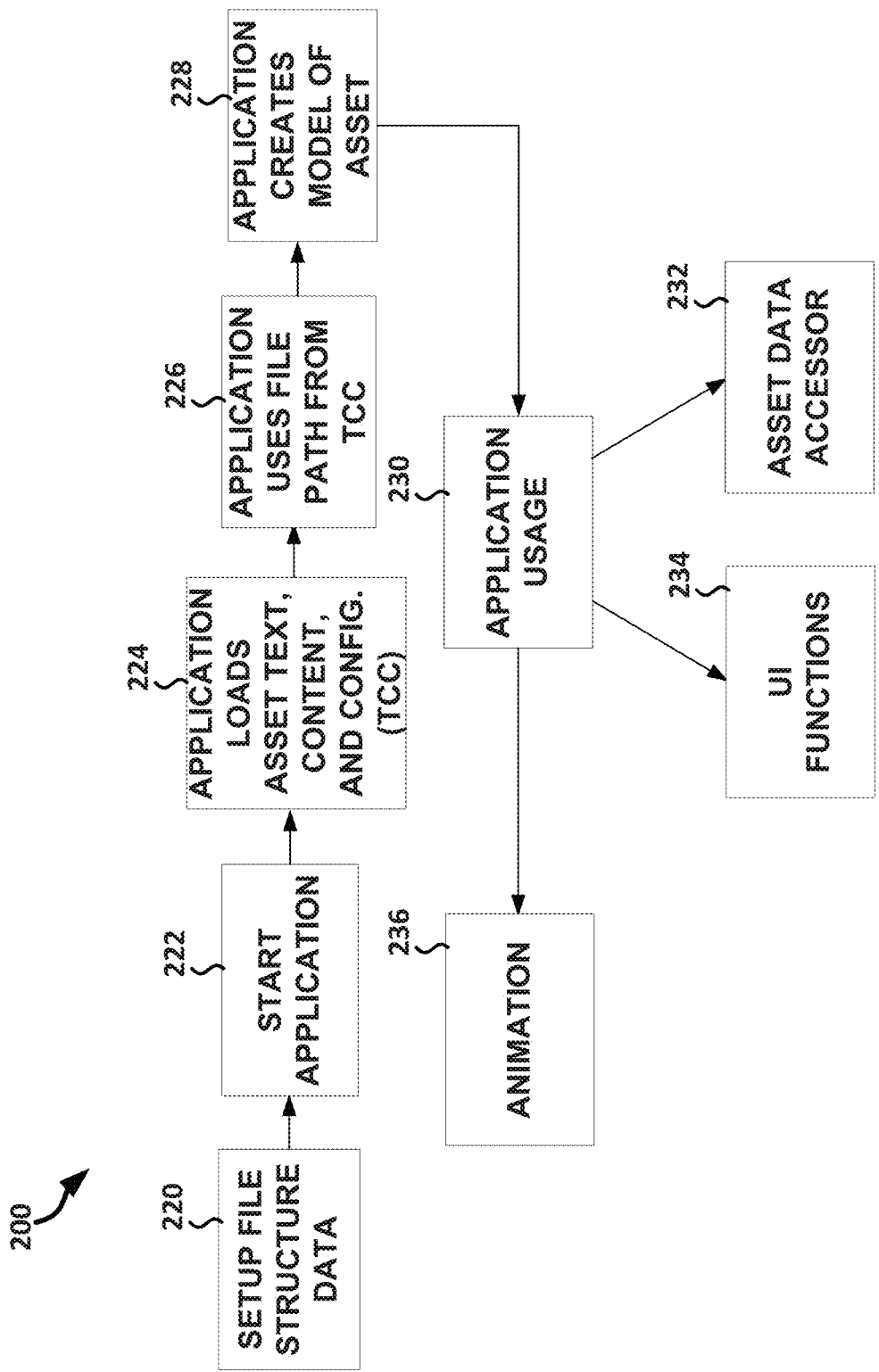
FIG. 2 illustrates, by way of example, a diagram of an embodiment of a method for application development.

FIG. 2 illustrates, by way of example, a diagram of an embodiment of a method 200 for application development. The method 200, as illustrated, includes setup of a file data structure (e.g., the asset rendering information 100 of FIG. 1), at operation 220; starting the application, at operation 222; the application loading asset TCC 108, at operation 224; the application using a file path from the TCC 108, at operation 226; the application creating a model of an asset, at operation 228; and application operation, at operation 230. The application operation 230 can include an asset data accessor operation 232, UI functions operation 234, and animation operation 236.

The operation 220 can include a developer, or other user, using the editor 110 to alter or augment the asset rendering information 100. The operation 220 can include adding media 102, a software definition 104, a model 106, or the TCC 108. The operation 220 can include the user selecting, dragging and dropping, entering text, or the like into the editor 110.

The operation 222 can include a user entering a command into a command prompt, selecting an icon, issuing an audio command, or the like, that causes the application to be executed. The operation 226 can include using a data path entry in the TCC 108 as a pointer to relevant data. At operation 228, the application generates a model of an object using the data corresponding to the pointer.

Figure 10:
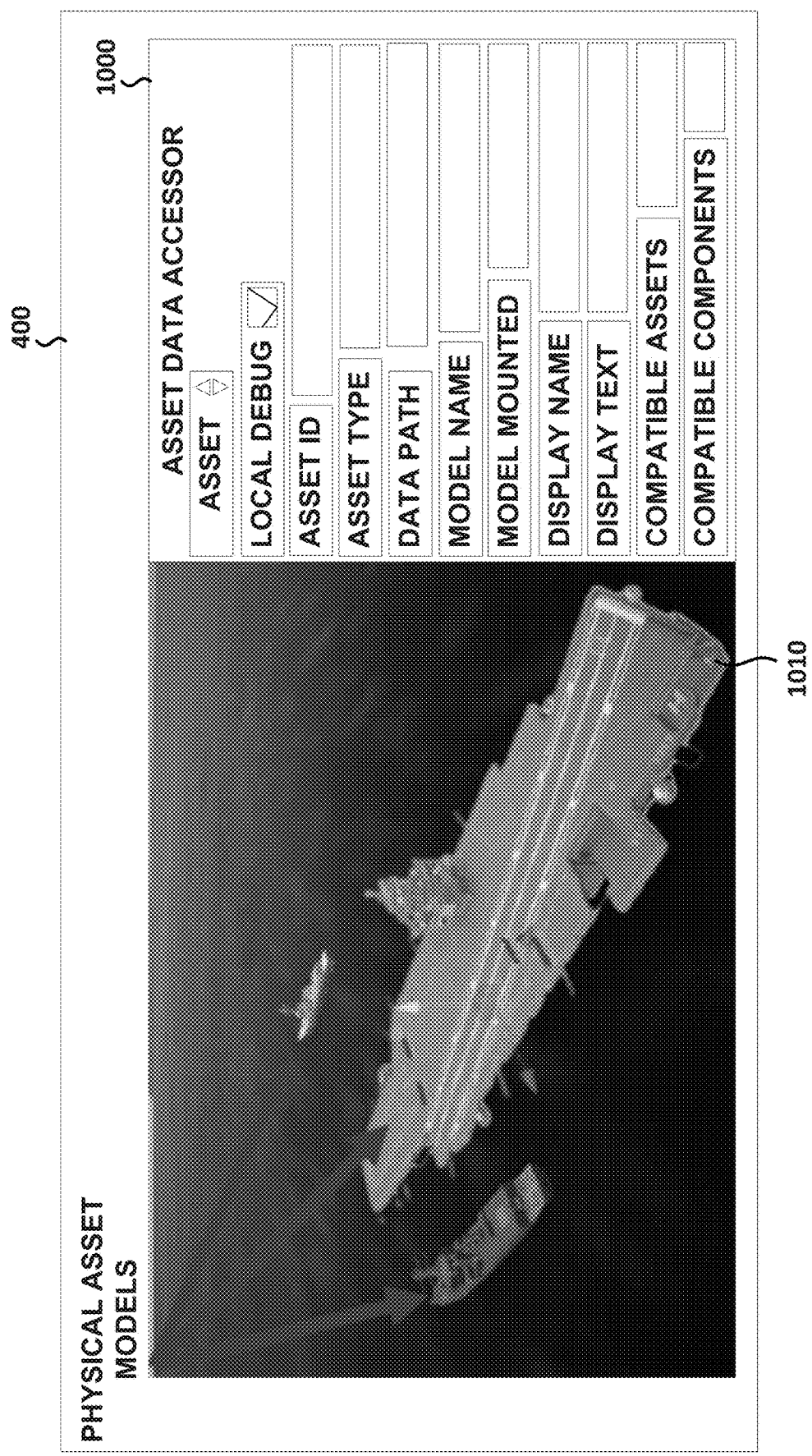
FIG. 10 illustrates, by way of example, a diagram of an embodiment of the asset data accessor.

At operation 230, the application provides an asset data accessor (see FIG. 10). The asset data accessor links the generated model to other objects, components, platforms, or the like. A platform is a higher-level object that includes one or more other objects with which a user can interact. The objects can include components with which a user can interact. Each of the platforms, objects, and components are examples of software objects. A software object maintains its state in variables and implements its behavior with methods. The software objects of the application can represent real-world objects.

Examples of application usage operations 230 include an asset data accessor operation 232, UI function operation 234, and animation operation 236. The asset data accessor operation 232 can include altering one or more fields provided on the UI. More details regarding the asset data accessor are provided regarding FIG. 10.

The UI functions operations 234 can include placing an object (see FIG. 4), moving an object, altering a camera position view of an object (see FIG. 4), altering a camera reference point of the camera (see FIGS. 5 and 6), playing a video, presenting an image, providing information regarding an object selected, providing information regarding a parent object or child object related to the object. A parent object is one that uses a child object in performing an operation. A child object relies on the parent object to have functionality. A platform object is an asset on which other assets are provided, transported, or the like. An example of a platform object is a tank, a parent object is a barrel, and a child object is a projectile. The projectile can have further child objects, such as a tracking system, sensors, or the like.

The animation operation 236 can include executing a stack of pre-specified functions that take as input, the object, camera position, camera reference point, or the like. The animation operation 236 is discussed in more detail regarding FIG. 10.

Figure 3:
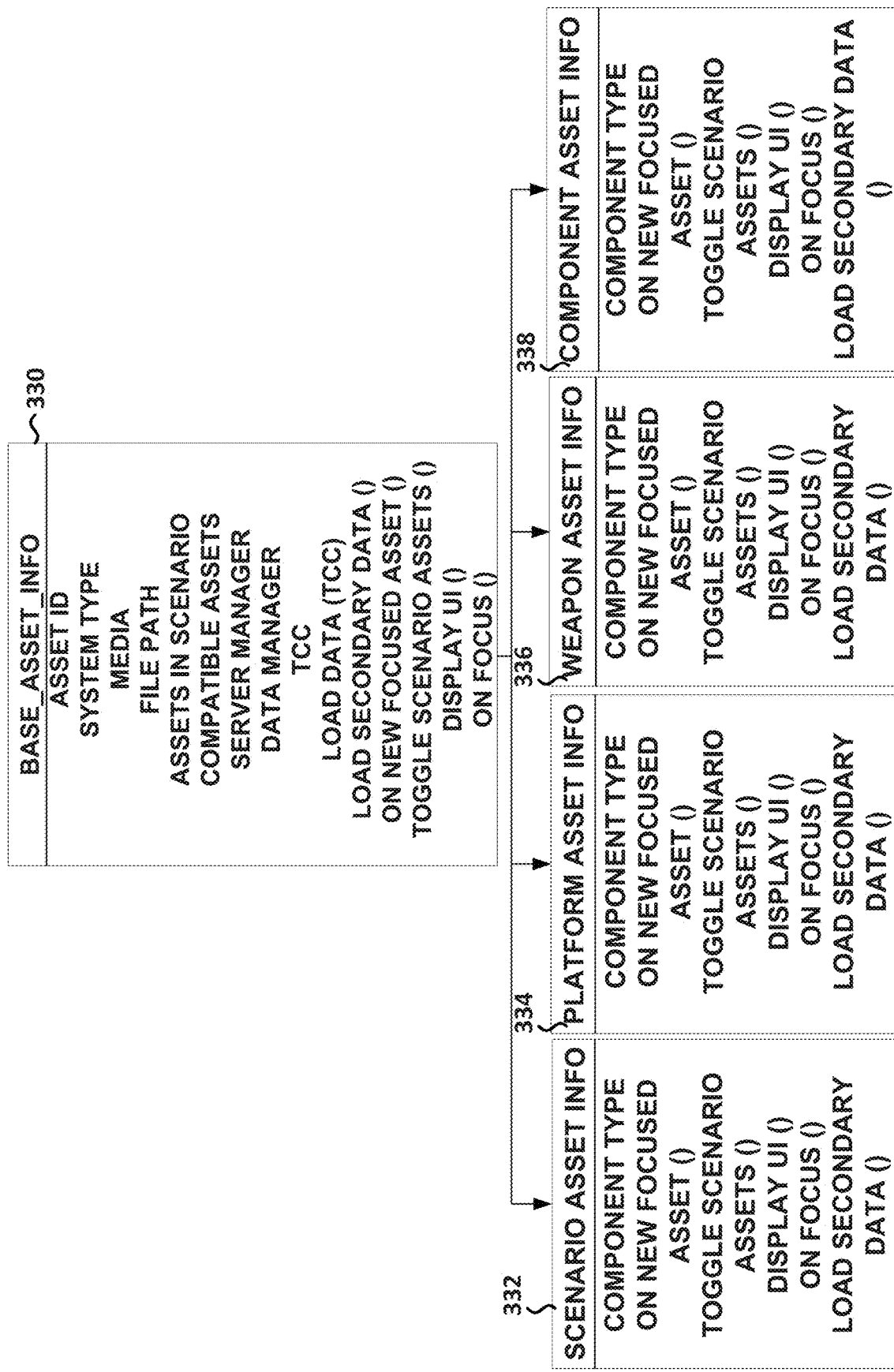
FIG. 3 illustrates, by way of example, a diagram of an embodiment of a data hierarchy for an object of embodiments.

FIG. 3 illustrates, by way of example, a diagram of an embodiment of a data hierarchy for an object of embodiments. The data hierarchy can be used to provide a view of the object on the UI, animate the object, provide data regarding a parent or child object, or the like. The data hierarchy includes base asset information 330 that can populate object types, such as a scenario asset, platform asset, weapon asset, component asset, or the like. Each of these assets can include its own information.

The base asset information 330 can include data indicating an asset identification that uniquely identifies the asset associated with an object, a system type (e.g., scenario, platform, weapon, component, or the like), media (e.g., links to images, videos, data sheets, audio, or other media associated with the asset), a file path to a model representing the asset, assets in scenario if the system type is a scenario, compatible assets (e.g., assets that are typically used or specified for use with the asset, sometimes called child or parent assets or objects), server manager (e.g., for connecting with other devices, such as a virtual reality device, such as a headset, or other display device), data manager (e.g., to manage data sent between the server managed by the server manager and the display device), or text content and configuration (TCC) (e.g., provided through the editor 110 as the TCC 108).

The base asset information 330 can include functions for instantiating and providing functionality to the asset. The functions can include one or more of load data (TCC), load secondary data ( ) on new focused asset ( ) toggle scenario assets ( ) display UI ( ) and on focus ( ) among others. The load data (TCC) retrieves the data that defines the object model from a location defined by the file path. The load secondary data ( ) builds the database and link the data in the database for ease of calling by load data (TCC). The on new focused asset ( ) function defines what to do with the model data or display object when a different asset becomes the focus of the camera object. The on new focused asset ( ) function can be different for different newly focused objects. The toggle scenario assets ( ) function can switch the display between assets of the scenario. The display UI ( ) controls the images and data in view on the UI. The on focus ( ) function defines how the object, camera, or camera reference point behaves when the asset comes in focus.

The base asset information 330 can be inherited by all assets of all types. The assets can also inherit the properties of the base asset information. Example asset types provided in FIG. 3 include scenario asset defined by scenario asset information 332, a platform asset defined by platform asset information 334, a weapon asset defined by weapon asset information 336, and a component asset defined by component asset information 338.

Figure 4:
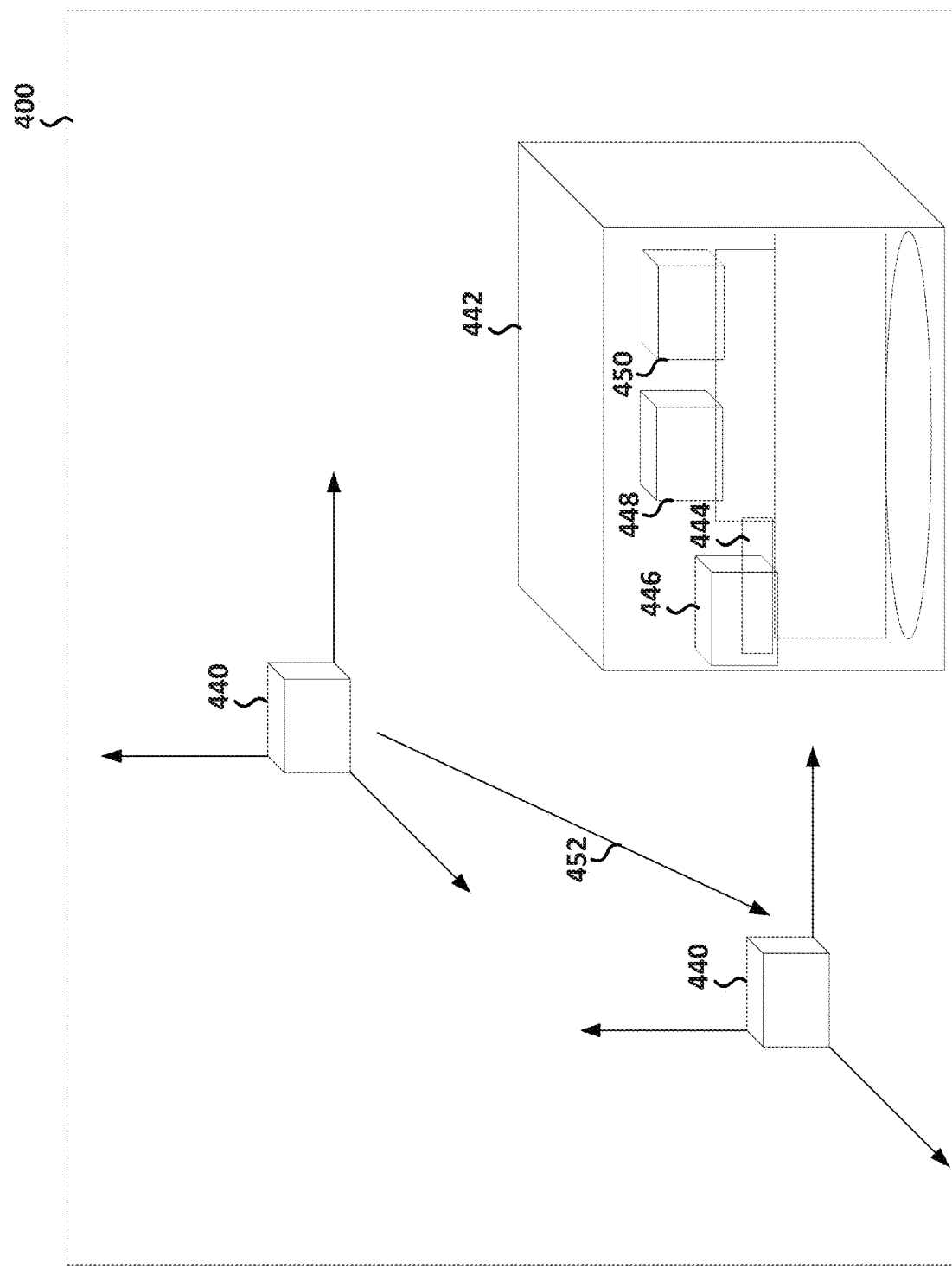
FIG. 4 illustrates, by way of example, a diagram of an embodiment of a UI provided by the game application.

FIG. 4 illustrates, by way of example, a diagram of an embodiment of a UI 400 provided by the game application. The UI 400 includes a camera object 440, an asset object 444 (in this example a tank), an asset bounding box 442, and child asset bounding boxes 446, 448, 450. The child assets are not presented without the parent asset that is the asset object 444.

The camera object 440 is a software control that alters the position of the camera object 440 in the scenario presented on the UI 400. The user can select the camera object 440, drag the camera object 440 to a new location in the scenario (as indicated by arrow 452), or rotate the camera object 440. The view of the scenario is then changed to be consistent with the camera object 440. This is performed by passing a location and view angle to a camera view function and providing the display with data from the model(s) corresponding to the perspective of the camera object 440.

The object 444 as illustrated includes other objects of interest (child objects with which a user can interact) that are sub-parts of the object 444. These child objects include objects in the corresponding bounding boxes 446, 448, 450. The user interacting with the UI 400 can select and interact with the object in the bounding boxes 446, 448, 450. The application can load information, an image, video, an animation, or the like, in response to the user selecting the object through the UI.

Figure 5:
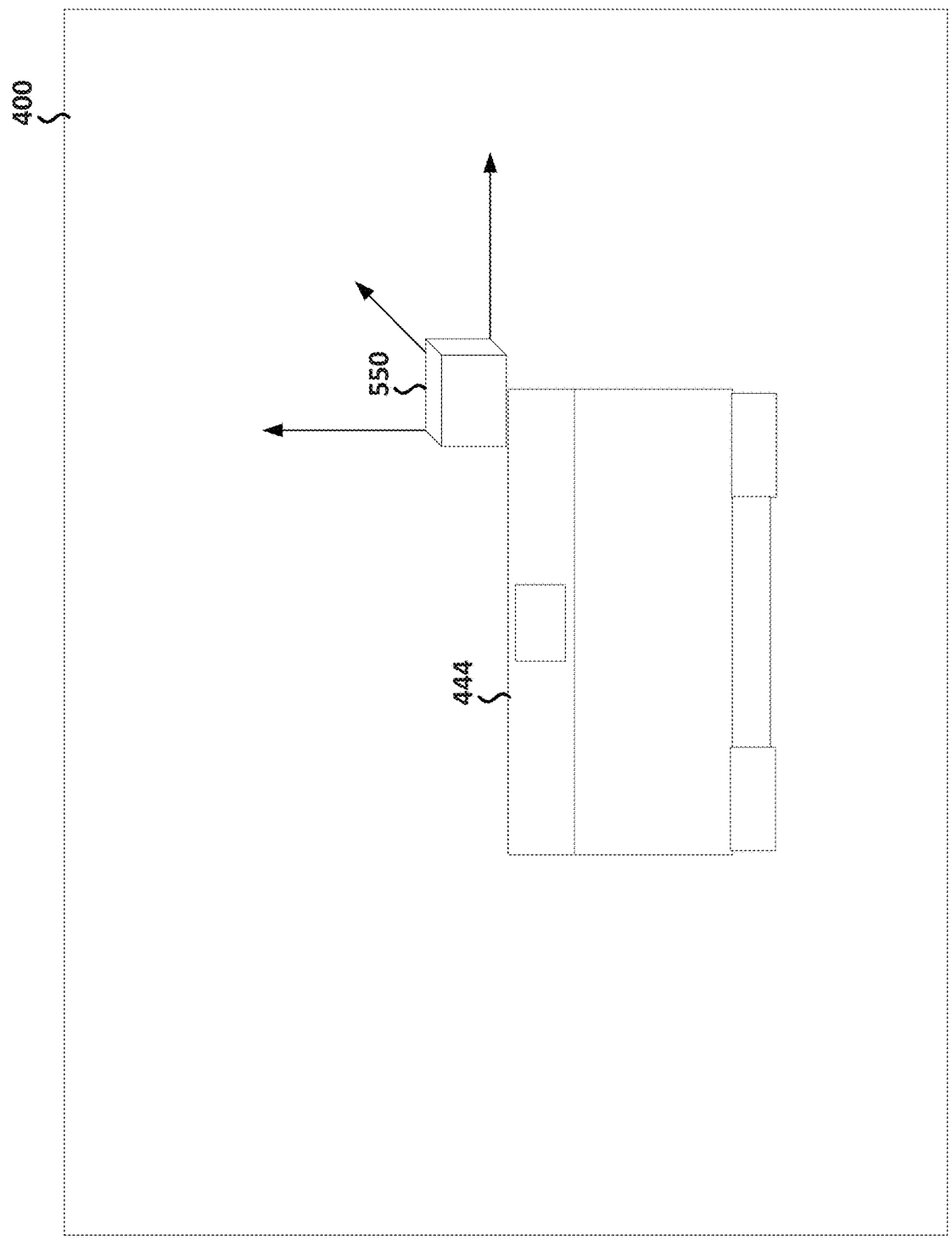
FIG. 5 illustrates, by way of example, a diagram of an embodiment of a reference point control for the camera object control.

FIG. 5 illustrates, by way of example, a diagram of an embodiment of a reference point control 550 for the camera object 440. The reference point control 550 indicates, to the camera object control 440 a location to focus on in the perspective indicated by the camera object 440. The reference point control 550 can store coordinates in a variable that can be passed to the camera object 440. The camera object 440 can use those coordinates to adjust the view angle or perspective of the camera object. If there is no reference point defined by the reference point control 550, the camera object 440 can use a location that is on an object in the field of view of the camera object as the reference point. In the example of FIG. 5, the reference point control 550 is positioned in an upper right corner of the tank object 444.

After the user releases the reference point control 550 at the desired focus location, the camera object 440 can execute based on the location. The UI 400 can be updated to include a view of the object 444 from the perspective indicated by the reference point control 550. The location indicated by the reference point control 550 can be stored in the TCC. Then, when the object 444 is placed later, the location indicated by the reference point control 550 can be passed to the camera object 440 and the perspective indicated can be provided on the UI 400. This can happen automatically after deployment.

In interacting with the object 444, the user can be presented, by the UI 400, with compatible objects that they can interact with. These compatible objects can be defined in the asset information 332, 334, 336, 338 and stored in the TCC. A compatible object, when selected by the user, can become the focus of the camera object 440. This can be performed by the user selecting the compatible object from the UI, then on loading, the camera object 440 can be passed the camera reference point defined by the camera point control 550 associated with the child object.

Figure 6:
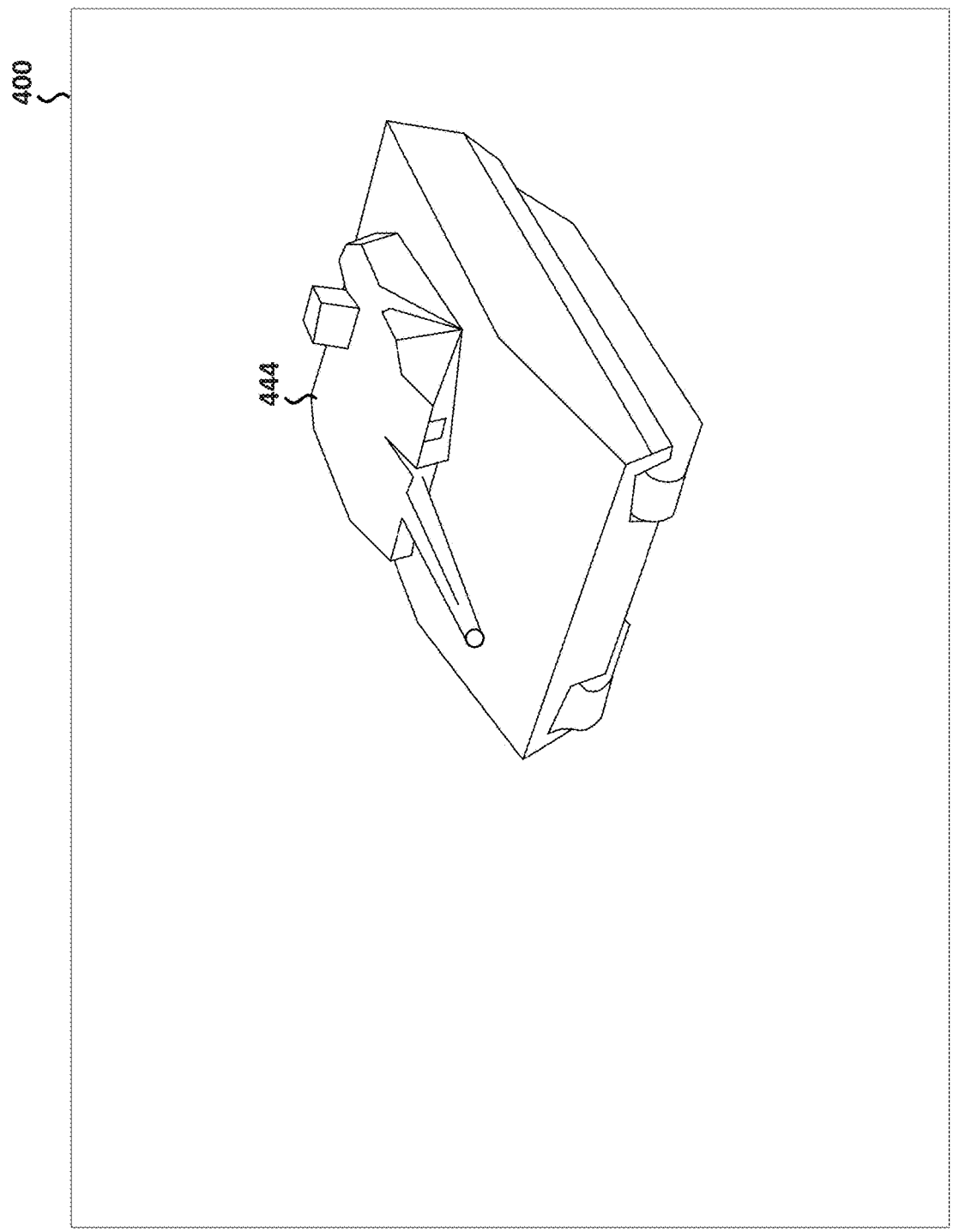
FIG. 6 illustrates, by way of example, a diagram of an embodiment of the object view of the object of FIG. 5 after the focus of the camera object is changed to the location indicated by the reference point control.
Figure 7:
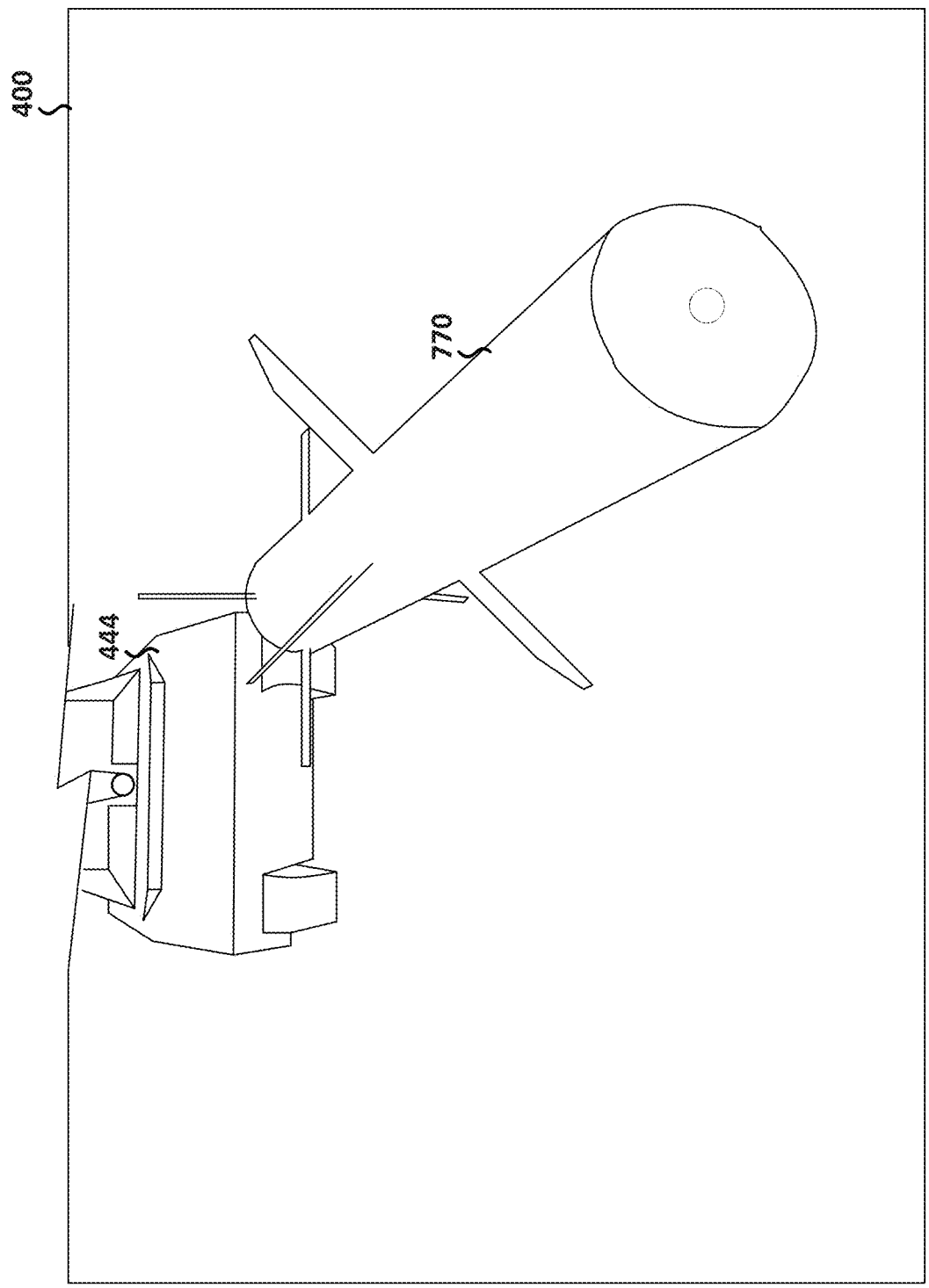
FIG. 7 illustrates, by way of example, a diagram of an embodiment of the UI of FIG. 6 after the user has selected a compatible object.

FIG. 7 illustrates, by way of example, a diagram of an embodiment of the UI 400 of FIG. 6 after the user has selected a compatible object 770. The UI 400 of FIG. 7 includes the selected child object 770 in focus. In creating the view of FIG. 7, the application can generate a stack of camera locations and reference points. Then, when the user selects a previously selected object, the camera locations and reference points of objects placed after the previously selected object can be removed from the stack, leaving the location and the reference point of the previously selected object on top of the stack for execution by the camera object 440.

Consider the following stack of camera locations and reference points in Table 1.

TABLE 1

| Camera location and reference point stack. | | |
|---|---|---|
| Object | Camera Location | Reference Point |
| Object 1 | (x0, y0, z0) | (x1, y1, z1) |
| Object 2 | (x2, y2, z2) | (x3, y3, z3) |
| Object 3 | (x4, y4, z4) | (x5, y5, z5) |
| Object 4 | (x6, y6, z6) | (x7, y7, z7) |

Assume that the user placed object 1, then object 2, then object 3, then object 4. The stack of camera locations and reference points can thus include the camera location and reference point of object 4 on top of the stack, object 3 directly below object 4, object 2 directly below object 3, and object 1 directly below object 2 on the stack. Then, if the user interacting with the UI selects object 2, the camera location and reference point corresponding to objects 3 and 4 can be removed from the stack. The camera location and reference point of object 2 can be loaded and executed by the camera object 440 to update the view. Further, the objects 3 and 4 can be removed from the display.

As discussed in the Background and elsewhere herein, an animation is created manually. This manual creation is very time consuming and cost prohibitive. Embodiments herein can use animations that are automatically performed using software code. The software code can simplify the animation process by eliminating the tedious manual tasks typically used in animation.

The software code can include using animation cards that are atomic animation operations. The atomic animation operations can be placed in an order and executed to generate an animation. The animation operations for an animation can be saved in a script to re-use a common animation, but allow for the object(s) called by the animation to be changed by just a simple software code change.

Figure 8:
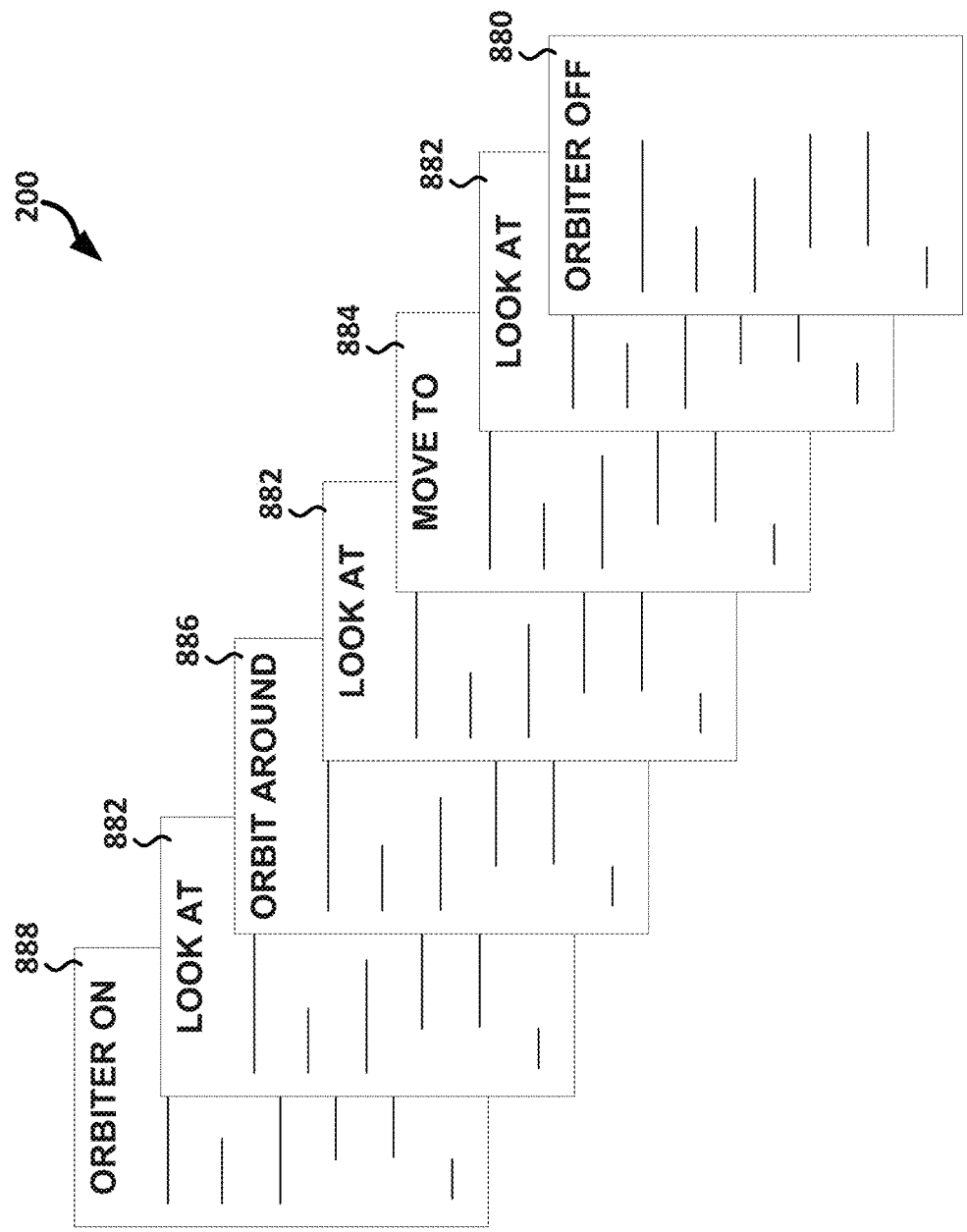
FIG. 8 illustrates, by way of example, a diagram of an embodiment of an animation card stack.

FIG. 8 illustrates, by way of example, a diagram of an embodiment of an animation card stack 800. Each card of the animation card stack can perform an atomic animation function. Examples of atomic animation functions include "orbiter off" function 880, "look at" function 882, "move to" function 884, "orbit around" function 886, and "orbiter on" function 888. The are other possible atomic operation functions beyond those illustrated in FIG. 8. Other examples of atomic animation functions include "move to so size of object equals A", "rotate", "custom callback" function, "enable user input" function, "disable user input" function, "create UI" function, "clean UI" function, or the like. Using these atomic animation functions, a very broad range of animations are possible.

The orbiter off function 880 disables an orbiter. The orbiter, when enabled and turned on (not necessarily in that order) revolves the camera about an axis going through the reference point. In the orbit, the camera remains focused on the reference point but the location of the camera moves in a circle about the object. Other orbiter related atomic animation cards include the orbiter on function 888 and the orbit around function 886. The orbiter on function 888 allows the orbiter to operate if the orbit around function 886 is called. The orbit around function 886 will not alter the view provided on the UI 400 unless the orbiter is turned on, such as by using the orbiter on function 888. The orbit around function 886 takes the reference point of the reference point control as input and the current camera location defined by the camera object 440. The orbit around function 886, additionally, can take a positive number as input. The number can indicate the number of orbits to perform around the reference point.

The look at function 882 takes the reference point as an input. The look at function can alter the focus of the camera to be the location specified by the reference point control. The move to function 884 changes the location of the camera object 440 or the location of an object in the scenario being presented on the UI 400. The move to function 884 can take a location, a delta location, an object, or the like as input, and move the location of the camera object 440 or object to the corresponding location defined by the input.

A rotate function can take an angle, a positive number, or the like as input. The rotate function can rotate the camera about the reference point, thus changing the location of the camera control object and the view provided on the UI 400. The enable user input and disable user input functions control whether user interaction with the UI 400 is ignored or acted on. If the enable user input function was executed since the last execution of the disable user input function, then user input can alter the view provided by the UI 400. If the disable user input function was executed since the last execution of the enable user input function, then user input will be ignored by the application and not alter the view provided by the UI 400. The user input can be disabled during animations, media playback, or the like.

Create UI and clean UI functions are related to the UI 400. The create UI function provides the UI and access to a corresponding application programming interface (API) associated with the UI. The clean UI function clears the UI back to its state when the create UI function was last executed or some other state in the application flow.

To create a custom animation sequence, the atomic animation functions can be provided to a user through the UI 400. The atomic animation functions can be dragged and dropped and edited using the UI 400.

Similar to how the base asset information 330 (see FIG. 3) can be inherited by all assets of all types, the animation cards can inherit data and properties from an animation card base.

Figure 9:
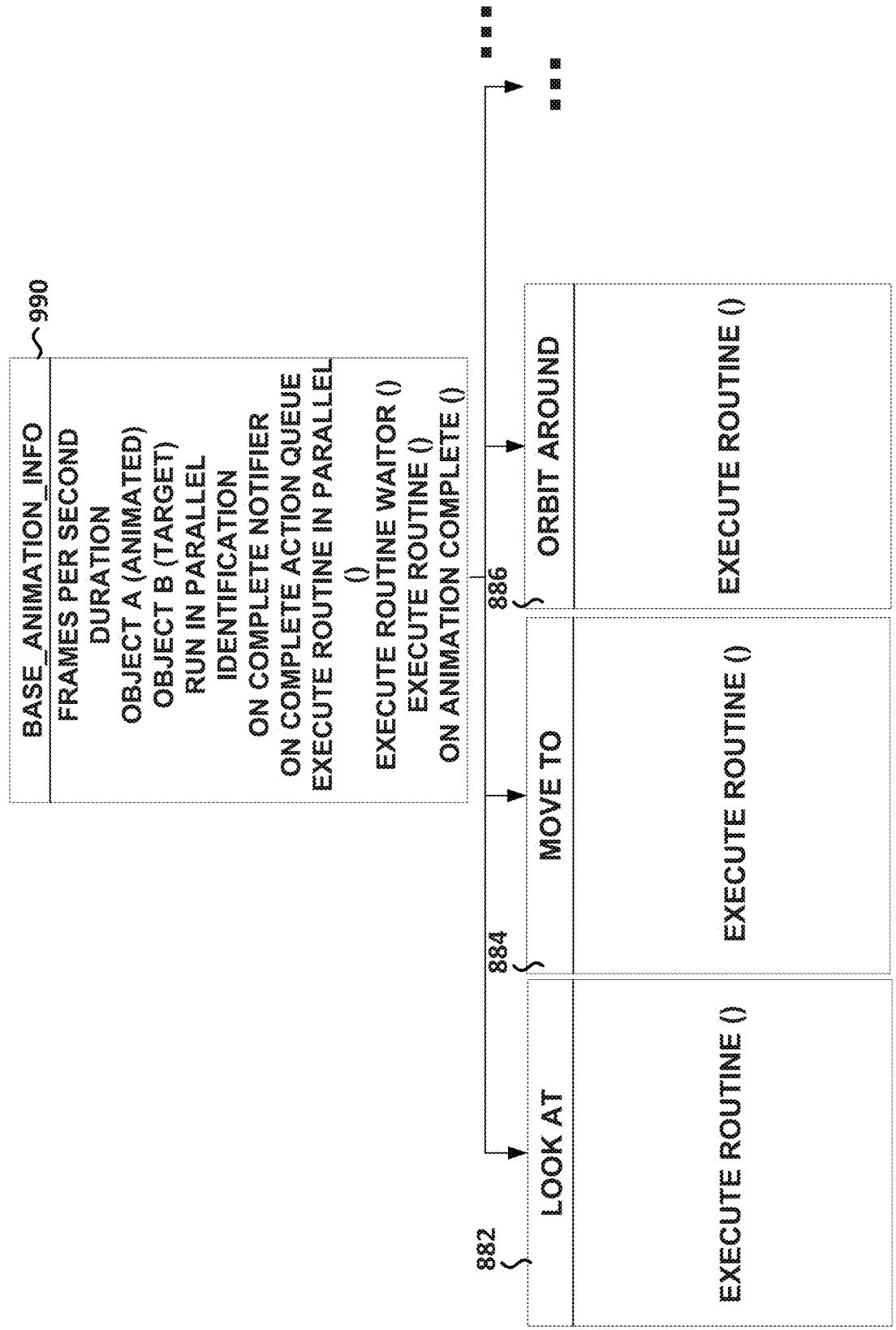
FIG. 9 illustrates, by way of example, a diagram of an embodiment of animation card functions being populated by information of an animation card base.

FIG. 9 illustrates, by way of example, a diagram of an embodiment of animation card functions 882, 884, 886 being populated by information of an animation card base 990. The animation card base 990 can include data indicating frames per second of the animation, duration of the animation, an object to be animated, a target object (an object to be affected by the animated object), whether animations will be run in parallel, an on complete notifier, an on complete action queue, a routine to execute in parallel, a time to wait to execute the routine, the routine to execute, or operations to perform on animation completion. Not all fields of the base animation information 990 need to be defined. Not all field of the base animation information 990 are inherited by the animation card functions 882, 884, 886.

FIG. 10 illustrates, by way of example, a diagram of an embodiment of the asset data accessor 1000. A developer or other user can define how an object appears using the asset data accessor 1000. The asset data accessor 1000 is provided on the UI 400. The asset data accessor 1000 is an API that that provides the user with the ability to link an object in the game application with corresponding interaction data. In the example of FIG. 10, a carrier is selected (as indicated by the outline of the object 1010). The asset data accessor 1000 provides the user a convenient, easy way to give an object in the game application and identity.

The user can alter which asset is being defined, whether a local debug operation is to be performed, an asset identification (for debugging and tracing), an asset type, a data path to the TCC, a model name of the model that is loaded when the object is selected, model mounted (e.g., an asset can have different models for different scenarios and model mounted can indicate which of the assets models is loaded by the application), a name to be displayed in response to object selection, text to be displayed along with the object (besides the display name), assets that are compatible with the object, and components that are compatible with the object. An asset is a standalone object, while a component requires another object for relevance. A sensor can be part of a satellite, for example. The satellite is considered the asset and the sensor is considered a component of the satellite.

Animating in code can have problems with scaling. To help alleviate the scaling problem, many solutions are possible. One solution that uses a "move to and size" animation function.

Figure 11:
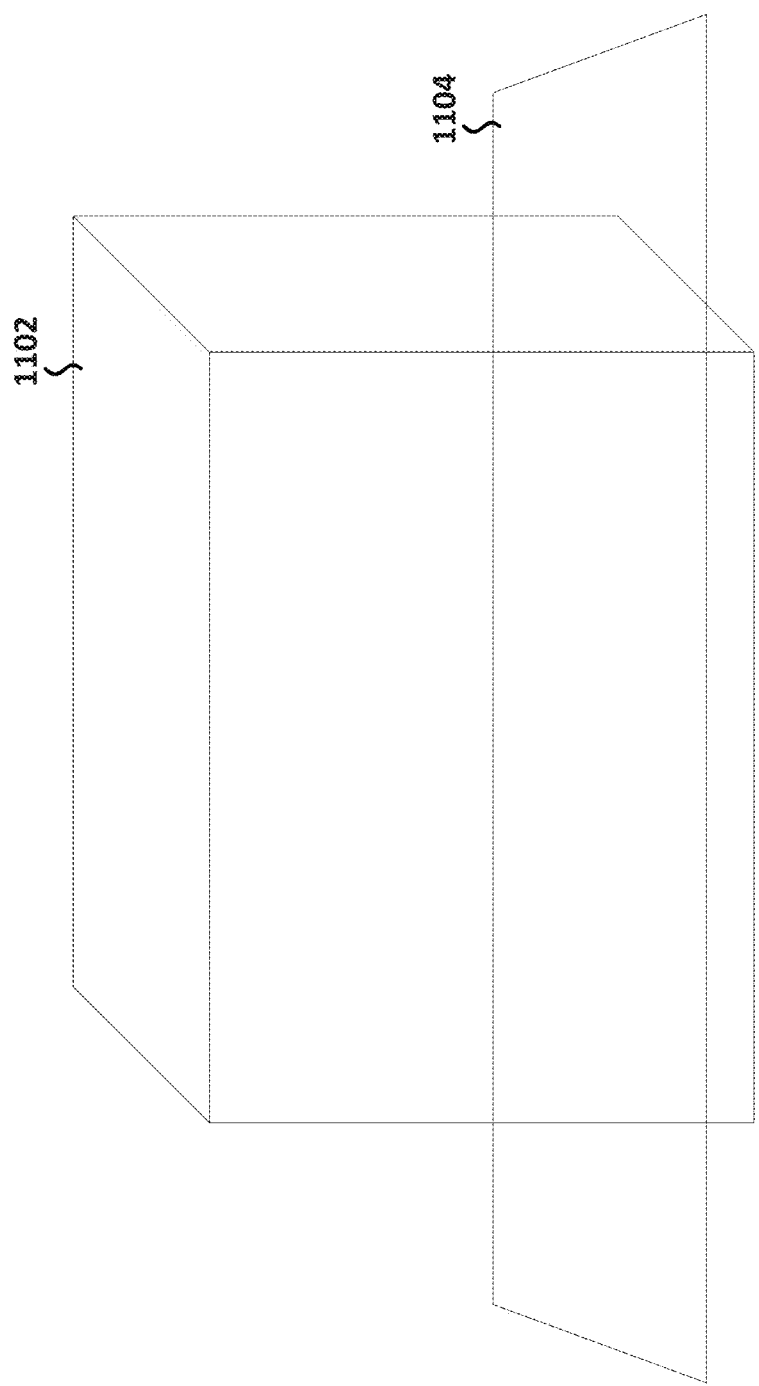
FIG. 11 illustrates, by way of example, a diagram of an embodiment of a bounding box and bounding plane.

FIG. 11 illustrates, by way of example, a diagram of an embodiment of a bounding box 1102 and bounding plane 1104. The bounding plane 1104 can define the width of the overall display (an area around the object being animated). The bounding box 1102 can define the maximum extent of the object(s) being animated. The bounding box can include relative coordinates that can be passed to the move to and size animation function. By executing the move to and size animation function and passing the relative coordinates of the bounding box 1102 and the bounding plane 1104, the focus provided on the UI 400 can remain on the object. Further, the amount of the screen occupied by the object(s) being animated can remain consistent through frames (assuming the move to and size function is called with sufficient frequency, such as 60 times per second, 30 times per second, some greater or lesser number of times, or some value therebetween).

Figure 12:
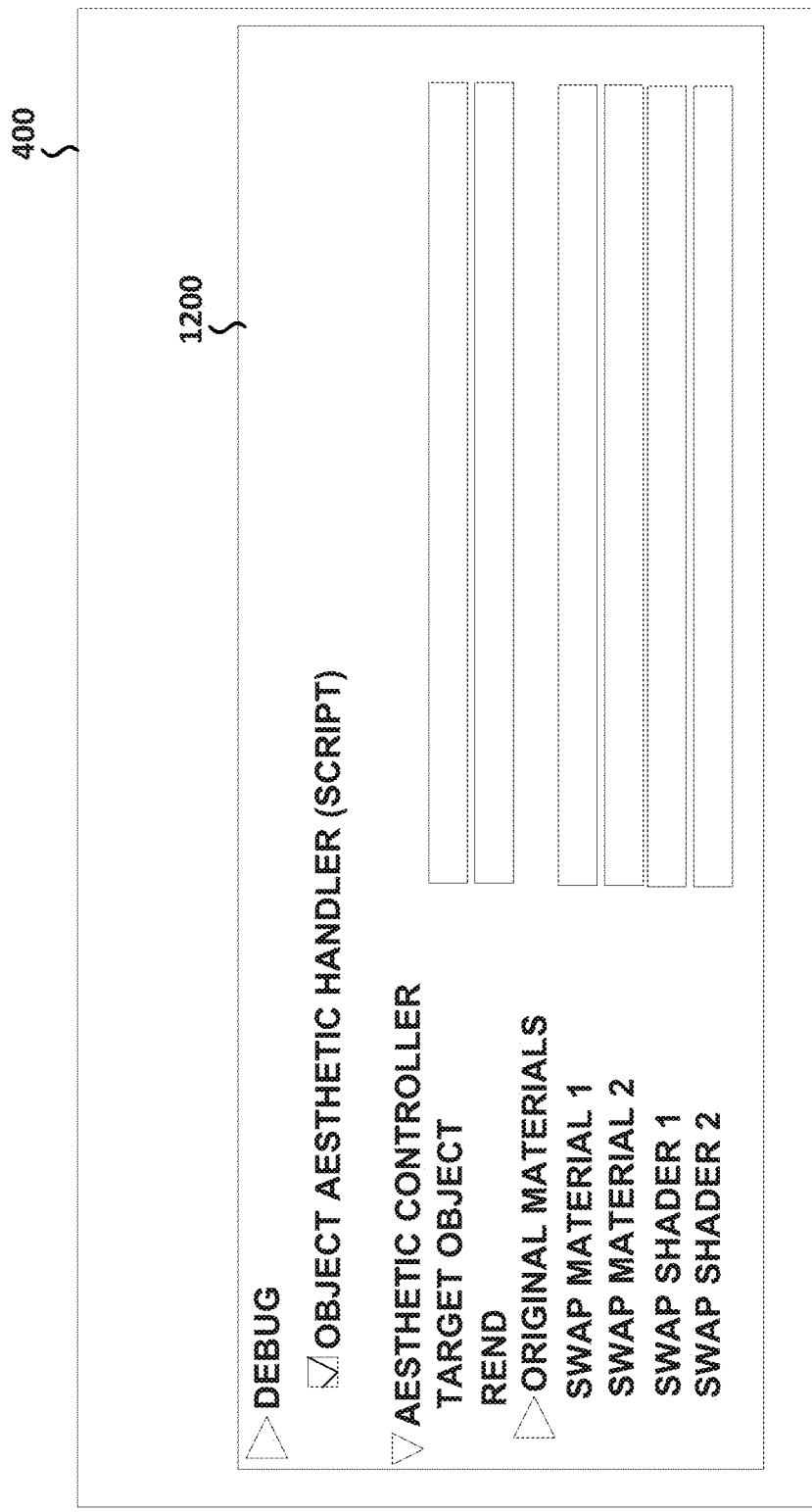
FIG. 12 illustrates, by way of example, a diagram of an embodiment of an aesthetic data handler provided on the UI.

FIG. 12 illustrates, by way of example, a diagram of an embodiment of an aesthetic data handler 1200 provided on the UI 400. The aesthetic data handler 1200 is a user facing portion of an API through which a user can alter an appearance of at least a portion of an object. The user can alter a skin, texture, pattern, color, or the like of at least a portion of the object using the aesthetic data handle 1200. For example, consider a component that is internal to an object that the user wishes to view. The developer or other user can use the aesthetic data handler 1200 to define how the material occluding the component, and the component appears to the user on the display to allow the user to view (and interact with) the component. Using the aesthetic data handler 1200 the user can cause a script to be generated. Using the aesthetic data handler 1200 the user can identify the target object, how the object rends, and alternate materials and shades for defined operations. The application can operate based on the data provided through the aesthetic data handler 1200 during user interaction.

Figure 13:
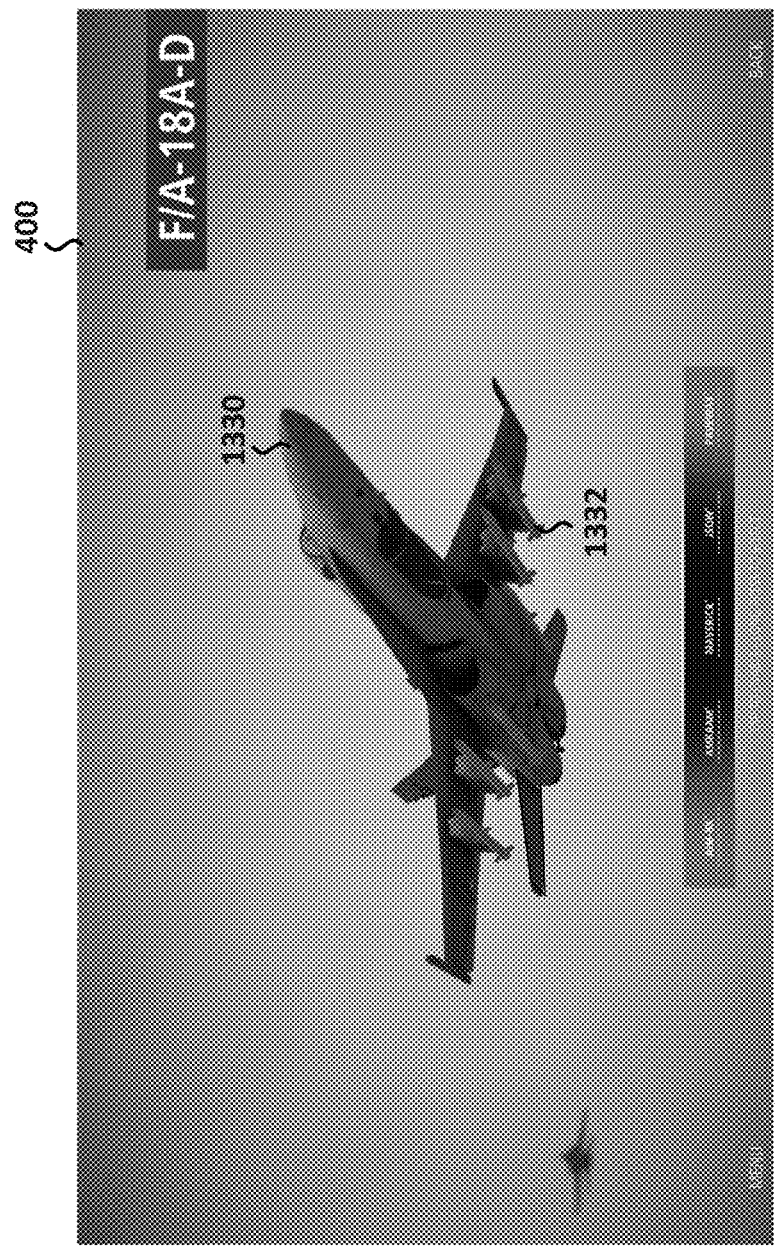
FIG. 13 illustrates, by way of example, a diagram of an embodiment of a view provided on the UI in response to a user selecting a component of an object.

FIG. 13 illustrates, by way of example, a diagram of an embodiment of a view provided on the UI 400 in response to a user selecting a component of an object. The view provided in FIG. 13 alters a color of the component 1332 of the object 1330. The color of the component 1332 can be altered in accord with the data entered in the aesthetic data handler 1200 and stored in the TCC 108.

Figure 14:
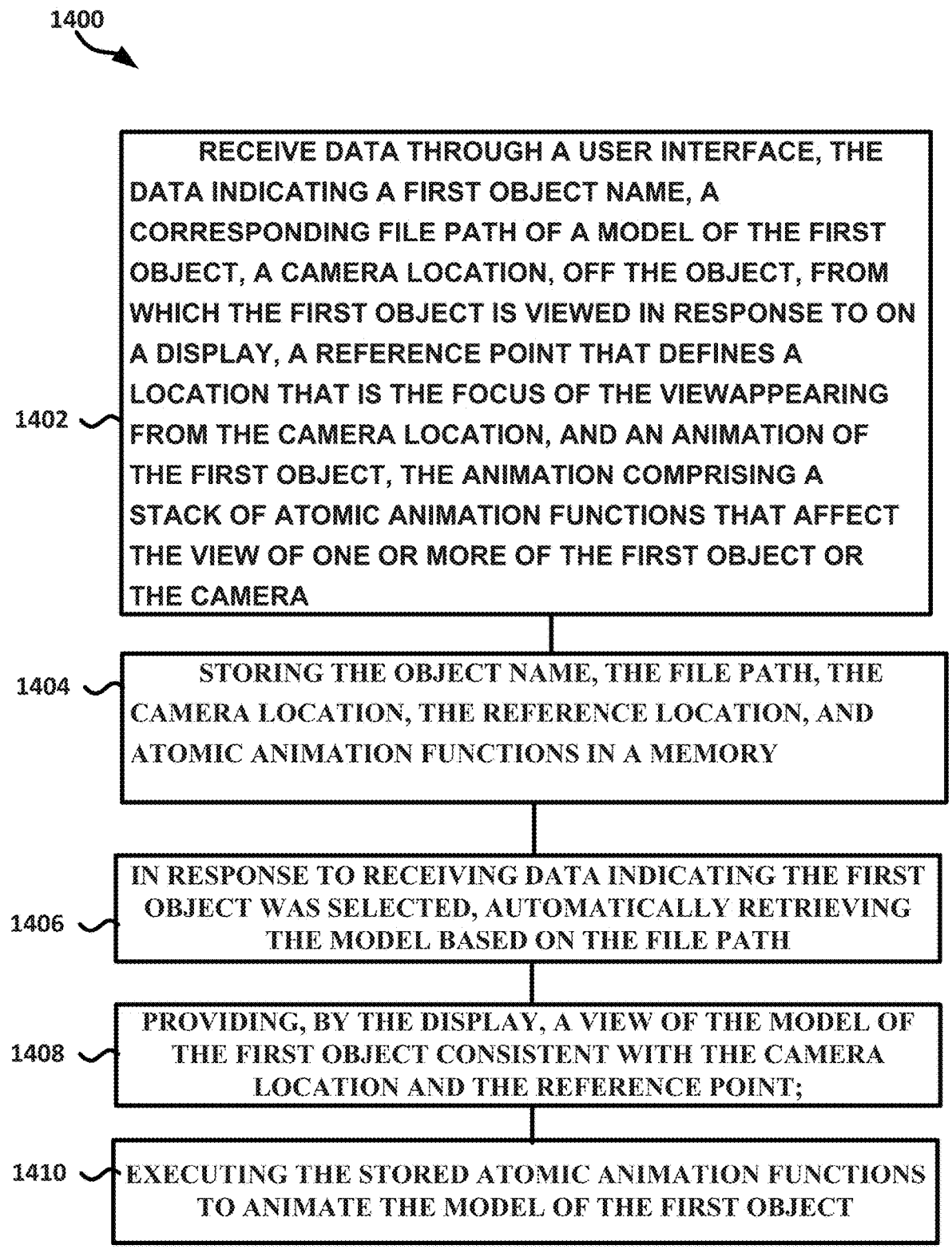
FIG. 14 illustrates, by way of example, a diagram of an embodiment of a method for software-based animation. The method can be implemented using one or more of the components of FIGS. 1-13.

FIG. 14 illustrates, by way of example, a diagram of an embodiment of a method 1400 for software-based animation. The method 1400 can be implemented using one or more of the components of FIG. 14. The method 1400 as illustrated includes receiving, by a user interface, data indicating a first object name, a corresponding file path of a model of the first object a camera location, off the object, from which the first object is viewed in response to appearing on a display, a reference point that defines a location that is the focus of the view from the camera location, and an animation of the first object, the animation comprising a stack of atomic animation functions that affect the view of one or more of the first object or the camera, at operation 1402; storing the object name, the file path, the camera location, the reference location, and atomic animation functions in a memory, at operation 1404; in response to receiving data indicating the first object was selected, automatically retrieving the model based on the file path, at operation 1406; providing, by the display, a view of the model of the first object consistent with the camera location and the reference point, at operation 1408; and executing the stored atomic animation functions to animate the model of the first object, at operation 1410.

The method 1400 can further include, wherein the atomic animation functions including a move to function that takes as input the first object or camera object, a destination for the first object or the camera object, and moves the first object or the camera object to the destination, and a look at function that takes as input a second reference point and updates the focus of the camera to the second reference point. The method 1400 can further include, wherein the atomic animation functions include a move to and size function that takes as input a location to move the first object to and a size, on the display, of the first object, and moves the first object to the location selects a location to place the camera object so that the first object appears to be the size.

The method 1400 can further include, wherein the specified size is within a bounding box. The method 1400 can further include, wherein the specified size includes a bounding plane that includes a width dimension outside the bounding box, the bounding plane intersecting the bounding box. The method 1400 can further include receiving, by the user interface, data indicating a primary color, texture, or pattern that defines how a portion of the first object appears when it is initially selected and a secondary color, texture, or pattern that defines how the portion of the first object appears when a component of the first object is selected, and in response to receiving data indicating the component has been selected, causing the first object to appear with the secondary color, texture, or pattern.

The method 1400 can further include, in response to receiving data indicating a second object was selected, automatically retrieving a second model of the second object. The method 1400 can further include providing, by the display, a view of the second model of the second object and the model of the first object consistent with a second camera location and second reference point associated with the second object. The method 1400 can further include after providing the view of the second model and in response to receiving data indicating the first object was selected again, providing, by the display, a view of the model of the first object consistent with the camera location and the reference point. The method 1400 can further include before receiving the data indicating the first object was selected again and in response to receiving data indicating a third object was selected, automatically retrieving a third model of the third object. The method 1400 can further include providing, by the display, a view of the third model, second model, and first model consistent with a third camera location and third reference point associated with the third object.

Figure 15:
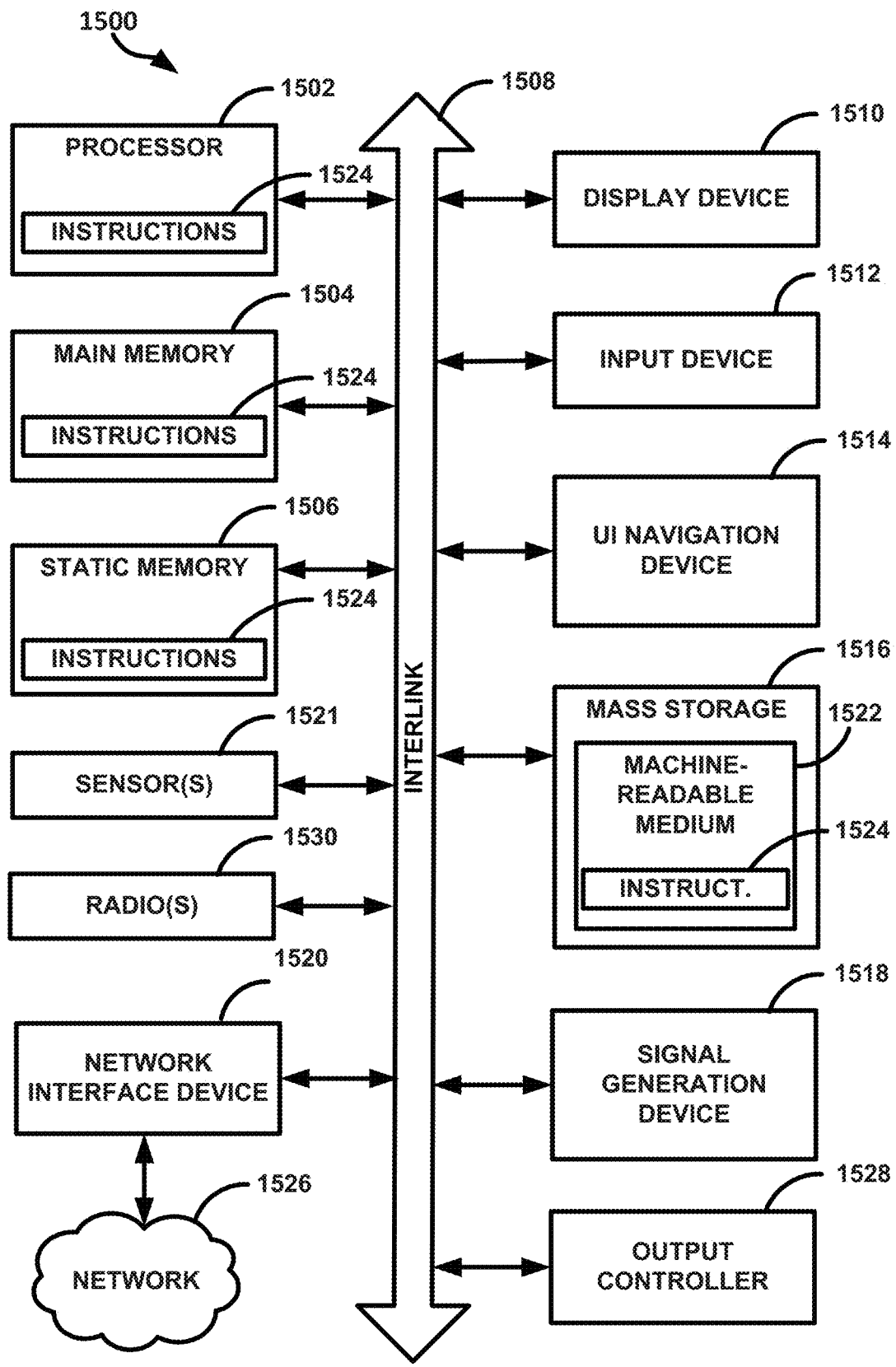
FIG. 15 illustrates, by way of example, a block diagram of an embodiment of a machine in the example form of a computer system within which instructions, for causing the machine to perform any one or more of the methodologies discussed herein, may be executed.

FIG. 15 illustrates, by way of example, a block diagram of an embodiment of a machine in the example form of a computer system 1500 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a mass storage unit 1516, a signal generation device 1518 (e.g., a speaker), a network interface device 1520, and a radio 1530 such as Bluetooth, WWAN, WLAN, and NFC, permitting the application of security controls on such protocols.

The mass storage unit 1516 includes a machine-readable medium 1522 on which is stored one or more sets of instructions and data structures (e.g., software) 1524 embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 can include a computer-implemented method for software-based animation, the method comprising receiving, by a user interface, data indicating a first object name, a corresponding file path of a model of the first object, a camera location, off the object, from which the first object is viewed in response to appearing on a display, a reference point that defines a location that is the focus of the view from the camera location, and an animation of the first object, the animation comprising a stack of atomic animation functions that affect the view of one or more of the first object or the camera, storing the object name, the file path, the camera location, the reference location, and atomic animation functions in a memory, in response to receiving data indicating the first object was selected, automatically retrieving the model based on the file path, providing, by the display, a view of the model of the first object consistent with the camera location and the reference point, and executing the stored atomic animation functions to animate the model of the first object.

In Example 2, Example 1 can further include, wherein the atomic animation functions including a move to function that takes as input the first object or camera object, a destination for the first object or the camera object, and moves the first object or the camera object to the destination, and a look at function that takes as input a second reference point and updates the focus of the camera to the second reference point.

In Example 3, at least one of Examples 1-2 can further include, wherein the atomic animation functions include a move to and size function that takes as input a location to move the first object to and a size, on the display, of the first object, and moves the first object to the location selects a location to place the camera object so that the first object appears to be the size.

In Example 4, at least one of Examples 1-3 can further include, wherein the specified size is within a bounding box.

In Example 5, at least one of Examples 1-4 can further include, wherein the specified size includes a bounding plane that includes a width dimension outside the bounding box, the bounding plane intersecting the bounding box.

In Example 6, at least one of Examples 1-5 can further include receiving, by the user interface, data indicating a primary color, texture, or pattern that defines how a portion of the first object appears when it is initially selected and a secondary color, texture, or pattern that defines how the portion of the first object appears when a component of the first object is selected, and in response to receiving data indicating the component has been selected, causing the first object to appear with the secondary color, texture, or pattern.

In Example 7, at least one of Examples 1-6 can further include, in response to receiving data indicating a second object was selected, automatically retrieving a second model of the second object, providing, by the display, a view of the second model of the second object and the model of the first object consistent with a second camera location and second reference point associated with the second object, and after providing the view of the second model and in response to receiving data indicating the first object was selected again, providing, by the display, a view of the model of the first object consistent with the camera location and the reference point.

In Example 8, at least one of Examples 1-7 can further include before receiving the data indicating the first object was selected again and in response to receiving data indicating a third object was selected, automatically retrieving a third model of the third object, and providing, by the display, a view of the third model, second model, and first model consistent with a third camera location and third reference point associated with the third object.

Example 9 can include a device or system of components configured to implement the method of at least one of Examples 1-8.

Example 10 can include a non-transitory machine-readable medium including instructions that, when executed by a machine, cause the machine to perform the method of at least one of Examples 1-8.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for software-based animation, the method comprising:
receiving, by a user interface, data indicating:
a first object name, a corresponding file path of a model of the first object;
a camera location, off the object, from which the first object is viewed in response to appearing on a display;
a reference location that defines a location that is the focus of the view from the camera location; and
an animation of the first object, the animation comprising a stack of atomic animation functions that affect the view of one or more of the first object or the camera;
storing the object name, the file path, the camera location, the reference location, and atomic animation functions in a memory;

in response to receiving data indicating the first object was selected, automatically retrieving the model based on the file path;

providing, by the display, a view of the model of the first object consistent with the camera location and the reference location; and executing the stored atomic animation functions to animate the model of the first object.

2. The method of claim 1, wherein the atomic animation functions including a move to function that takes as input the first object or the camera, a destination for the first object or the camera, and moves the first object or the camera to the destination, and a look at function that takes as input a second reference location and updates the focus of the camera to the second reference location.

3. The method of claim 2, wherein the atomic animation functions include a move to and size function that takes as input a location to move the first object to and a size, on the display, of the first object, and moves the first object to the location selects a location to place the camera so that the first object appears to be the size.

4. The method of claim 3, wherein the specified size is within a bounding box.

5. The method of claim 4, wherein the specified size includes a bounding plane that includes a width dimension outside the bounding box, the bounding plane intersecting the bounding box.

6. The method of claim 5, further comprising:

receiving, by the user interface, data indicating;

a primary color, texture, or pattern that defines how a portion of the first object appears when it is initially selected and a secondary color, texture, or pattern that defines how the portion of the first object appears when a component of the first object is selected; and in response to receiving data indicating the component has been selected, causing the first object to appear with the secondary color, texture, or pattern.

7. The method of claim 6, further comprising:

in response to receiving data indicating a second object was selected, automatically retrieving a second model of the second object;

providing, by the display, a view of the second model of the second object and the model of the first object consistent with a second camera location and second reference location associated with the second object; and after providing the view of the second model and in response to receiving data indicating the first object was selected again, providing, by the display, a view of the model of the first object consistent with the camera location and the reference location.

8. The method of claim 7, further comprising:

before receiving the data indicating the first object was selected again and in response to receiving data indicating a third object was selected, automatically retrieving a third model of the third object; and providing, by the display, a view of the third model, second model, and the model of the first object consistent with a third camera location and third reference location associated with the third object.

9. A system comprising:

a user interface configured to receive data indicating:

a first object name, a corresponding file path of a model of the first object;

a camera location, off the object, from which the first object is viewed in response to appearing on a display;

a reference location that defines a location that is the focus of the view from the camera location; and an animation of the first object, the animation comprising a stack of atomic animation functions that affect the view of one or more of the first object or the camera;

a memory configured to store the object name, the file path, the camera location, the reference location, and atomic animation function;

processing circuitry coupled to the user interface, the processing circuitry configured to:

in response to receiving data indicating the first object was selected, automatically retrieving the model based on the file path;

cause a display to provide a view of the model of the first object consistent with the camera location and the reference location; and execute the stored atomic animation functions to animate the model of the first object.

10. The system of claim 9, wherein the atomic animation functions including a move to function that takes as input the first object or camera, a destination for the first object or the camera, and moves the first object or the camera, to the destination, and a look at function that takes as input a second reference location and updates the focus of the camera to the second reference location.

11. The system of claim 10, wherein the atomic animation functions include a move to and size function that takes as input a location to move the first object to and a size, on the display, of the first object, and moves the first object to the location selects a location to place the camera so that the first object appears to be the size.

12. The system of claim 11, wherein the specified size is within a bounding box.

13. The system of claim 12, wherein the specified size includes a bounding plane that includes a width dimension outside the bounding box, the bounding plane intersecting the bounding box.

14. The system of claim 13, further comprising:

receiving, by a user interface, data indicating:

a primary color, texture, or pattern that defines how a portion of the first object appears when it is initially selected and a secondary color, texture, or pattern that defines how the portion of the first object appears when a component of the first object is selected; and in response to receiving data indicating the component has been selected, causing the first object to appear with the secondary color, texture, or pattern.

15. The system of claim 14, further comprising:

in response to receiving data indicating a second object was selected, automatically retrieving a second model of the second object;

providing, by the display, a view of the second model of the second object and the model of the first object consistent with a second camera location and second reference location associated with the second object; and after providing the view of the second model and in response to receiving data indicating the first object was selected again, providing, by the display, a view of the model of the first object consistent with the camera location and the reference location.

16. The system of claim 15, further comprising:

before receiving the data indicating the first object was selected again and in response to receiving data indicating a third object was selected, automatically retrieving a third model of the third object; and providing, by the display, a view of the third model, second model, and the model of the first object consistent with a third camera location and third reference location associated with the third object.

17. A non-transitory machine-readable medium including instructions that, when executed by a machine, cause the machine to perform operations comprising:
receive data indicating:
a first object name, a corresponding file path of a model of the first object;
a camera location, off the object, from which the first object is viewed in response to appearing on a display;
a reference location that defines a location that is the focus of the view from the camera location; and
an animation of the first object, the animation comprising a stack of atomic animation functions that affect the view of one or more of the first object or the camera;
storing the object name, the file path, the camera location, the reference location, and atomic animation function in a memory;
in response to receiving data indicating the first object was selected, automatically retrieving the model based on the file path;
providing a view of the model of the first object consistent with the camera location and the reference location; and
executing the stored atomic animation functions to animate the model of the first object.

18. The non-transitory machine-readable medium of claim 17, wherein the atomic animation functions including a move to function that takes as input the first object or camera, a destination for the first object or the camera, and moves the first object or the camera to the destination, and a look at function that takes as input a second reference location and updates the focus of the camera to the second reference location.

19. The non-transitory machine-readable medium of claim 18, wherein the atomic animation functions include a move to and size function that takes as input a location to move the first object to and a size, on the display, of the first object, and moves the first object to the location selects a location to place the camera so that the first object appears to be the size.

20. The non-transitory machine-readable medium of claim 19, wherein the operations further comprise:
in response to receiving data indicating a second object was selected, automatically retrieving a second model of the second object;
providing, by the display, a view of the second model of the second object and the model of the first object consistent with a second camera location and second reference location associated with the second object; and
after providing the view of the second model and in response to receiving data indicating the first object was selected again, providing, by the display, a view of the model of the first object consistent with the camera location and the reference location.

* * * * *